US00RE40094E

(19) United States
(12) Reissued Patent
Nakano

(10) Patent Number: US RE40,094 E
(45) Date of Reissued Patent: Feb. 26, 2008

(54) COMPUTER

(75) Inventor: Rumi Nakano, Tokyo (JP)

(73) Assignee: Sony Corporation, Tokyo (JP)

(21) Appl. No.: 29/218,399

(22) Filed: Dec. 2, 2004

Related U.S. Patent Documents

Reissue of:
(64) Patent No.: Des. 466,499
Issued: Dec. 3, 2002
Appl. No.: 29/145,270
Filed: Jul. 20, 2001

(51) LOC (8) Cl. ..... 14-02
(52) U.S. Cl. ..... D14/328
(58) Field of Classification Search ..... D14/315, D14/322, 327, 328; D18/1, 2, 7, 11; 235/145 A, 235/145 R; 341/22, 23; 345/104, 156, 168, 345/169, 173; 361/680–686
See application file for complete search history.

(56) References Cited

U.S. PATENT DOCUMENTS

| | | | | | |
|---|---|---|---|---|---|
| D310,517 | S | * | 9/1990 | Hara et al. | D14/324 |
| D313,403 | S | * | 1/1991 | Esslinger et al. | D14/324 |
| D334,738 | S | * | 4/1993 | Kim | D14/324 |
| D392,625 | S | * | 3/1998 | Tang et al. | D14/324 |
| D430,156 | S | * | 8/2000 | Yamada | D14/328 |

FOREIGN PATENT DOCUMENTS

| | | |
|---|---|---|
| JP | 894367 | 3/1994 |
| JP | 8-94367 S | 3/1994 |
| JP | 938677 | 11/1995 |
| JP | 9-38677 S | 11/1995 |
| JP | 946656 | 2/1996 |
| JP | 9-46656 S | 2/1996 |
| JP | 955287 | 6/1996 |
| JP | 9-55287 S | 6/1996 |
| JP | 1014967 | 7/1998 |
| JP | 10-14967 S | 7/1998 |
| JP | 11-18613 S | 8/2001 |

OTHER PUBLICATIONS

Home page "Apple I–Book", 2pgs, Apple Computer Inc. (Mar. 2001).
Catalog "If Design Award 1997, 1998 CF–25", 2 pgs, Panasonic (1997 & 1998).
Home page "PetitWeb", 4 pgs, NTT (Apr. 2000).

* cited by examiner

*Primary Examiner*—Freda S. Nunn
(74) *Attorney, Agent, or Firm*—Rader, Fishman & Grauer, PLLC

(57) CLAIM

The ornamental design for a computer, as shown and described.

DESCRIPTION

FIG. 1 is a perspective view of a computer showing my new design;
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof; and,
FIG. 7 is a bottom plan view thereof.
*Portions of FIGS. 1 and 4 that are shown as broken lines are for illustrative purpose only and form no part of the claimed design.*

1 Claim, 4 Drawing Sheets

Matter enclosed in heavy brackets [ ] appears in the original patent, but forms no part of this reissue; matter printed in italics indicates the additions made by reissue.

UNITED STATES PATENT AND TRADEMARK OFFICE

CERTIFICATE OF CORRECTION

PATENT NO. : RE 40,094 E
APPLICATION NO. : 29/218399
DATED : February 26, 2008
INVENTOR(S) : Nakano It is certified that error appears in the above-identified patent and that said Letters Patent is hereby corrected as shown below:

Title page illustrating a figure(s) should be deleted, and replaced with title page illustrating a figure(s). (attached)

Delete drawing sheets 1-4, and replace with new drawing sheets 1-4. (attached)

Signed and Sealed this

Twenty-third Day of June, 2009

John Doll

JOHN DOLL
*Acting Director of the United States Patent and Trademark Office*

(19) United States
(12) Reissued Patent
Nakano

(10) Patent Number: US RE40,094 E
(45) Date of Reissued Patent: Feb. 26, 2008

(54) COMPUTER

(75) Inventor: Rumi Nakano, Tokyo (JP)

(73) Assignee: Sony Corporation, Tokyo (JP)

(21) Appl. No.: 29/218,399

(22) Filed: Dec. 2, 2004

Related U.S. Patent Documents

Reissue of:
(64) Patent No.: Des. 466,499
Issued: Dec. 3, 2002
Appl. No.: 29/145,270
Filed: Jul. 20, 2001

(51) LOC (8) Cl. ..... 14-02
(52) U.S. Cl. ..... D14/328
(58) Field of Classification Search ..... D14/315, D14/322, 327, 328; D18/1, 2, 7, 11; 235/145 A, 235/145 R; 341/22, 23; 345/104, 156, 168, 345/169, 173; 361/680-686
See application file for complete search history.

(56) References Cited

U.S. PATENT DOCUMENTS

| | | | | | |
|---|---|---|---|---|---|
| D310,517 | S | * | 9/1990 | Hara et al. | D14/324 |
| D313,403 | S | * | 1/1991 | Esslinger et al. | D14/324 |
| D334,738 | S | * | 4/1993 | Kim | D14/324 |
| D392,625 | S | * | 3/1998 | Tang et al. | D14/324 |
| D430,156 | S | * | 8/2000 | Yamada | D14/328 |

FOREIGN PATENT DOCUMENTS

| | | |
|---|---|---|
| JP | 894367 | 3/1994 |
| JP | 8-94367 S | 3/1994 |
| JP | 938677 | 11/1995 |
| JP | 9-38677 S | 11/1995 |
| JP | 946656 | 2/1996 |
| JP | 9-46656 S | 2/1996 |
| JP | 955287 | 6/1996 |
| JP | 9-55287 S | 6/1996 |
| JP | 1014967 | 7/1998 |
| JP | 10-14967 S | 7/1998 |
| JP | 11-18613 S | 8/2001 |

OTHER PUBLICATIONS

Home page "Apple I-Book", 2pgs, Apple Computer Inc. (Mar. 2001).
Catalog "If Design Award 1997, 1998 CF 25", 2 pgs, Panasonic (1997 & 1998).
Home page "PetitWeb", 4 pgs, NTT (Apr. 2000).

* cited by examiner

*Primary Examiner*—Freda S. Nunn
(74) *Attorney, Agent, or Firm*—Rader, Fishman & Grauer, PLLC

(57) CLAIM

The ornamental design for a computer, as shown and described.

DESCRIPTION

Figure 1:
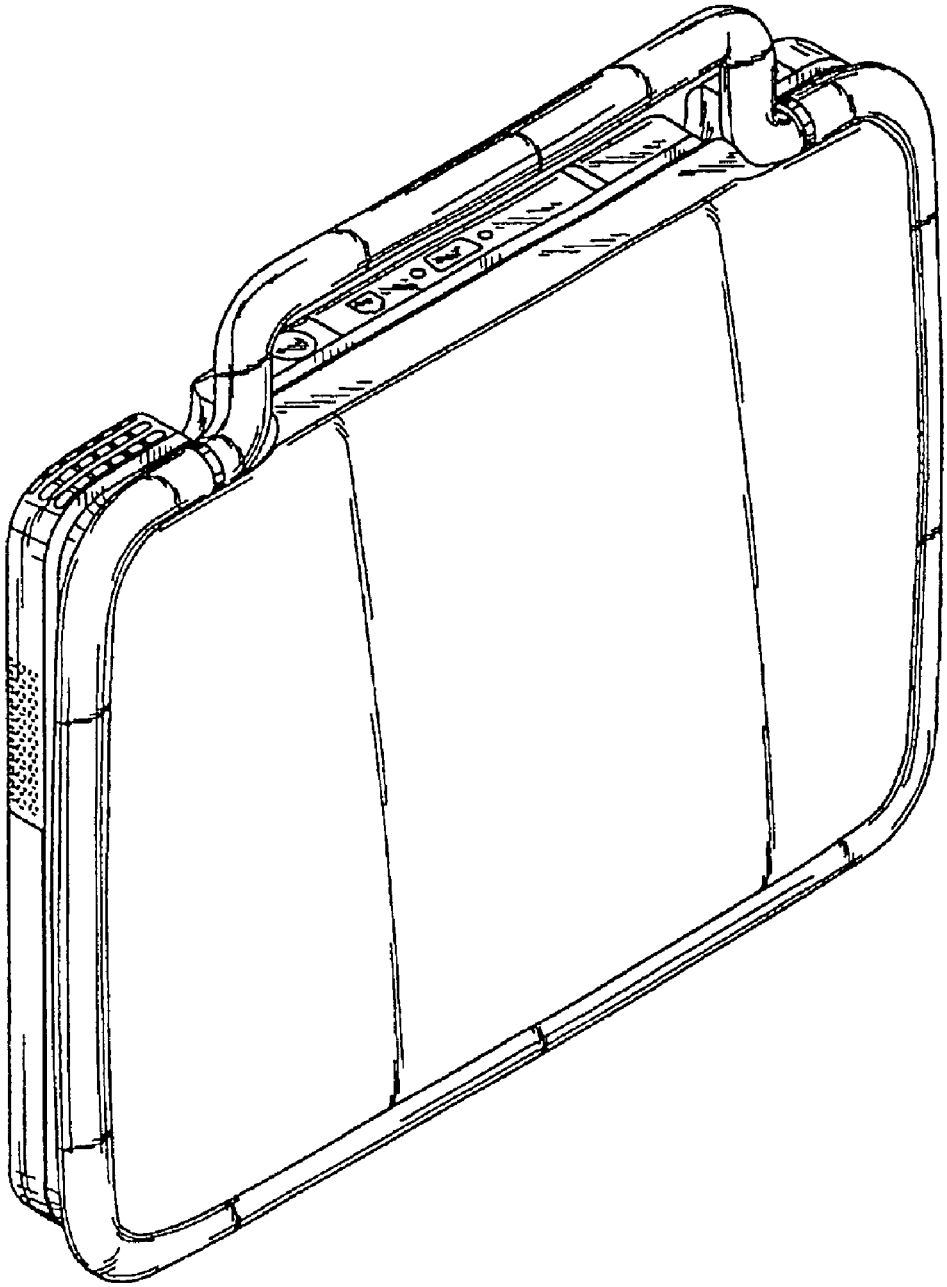
Figure 2:
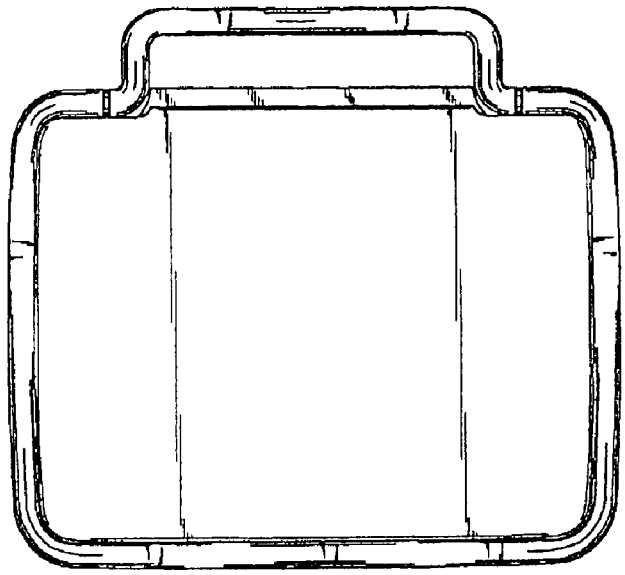
Figure 3:
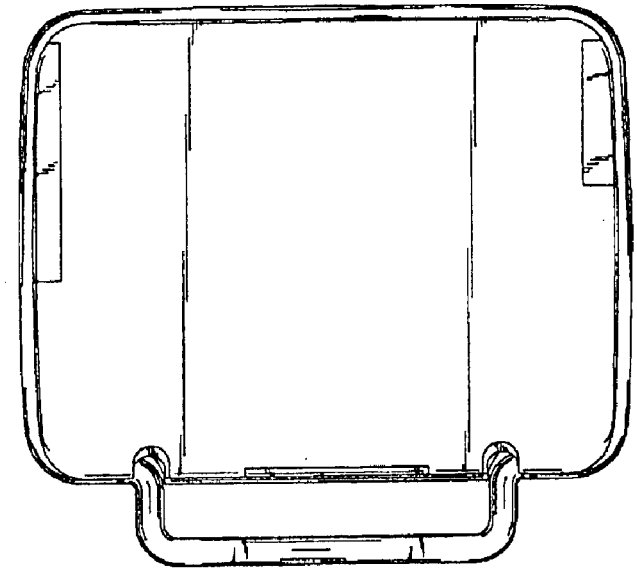
Figure 4:
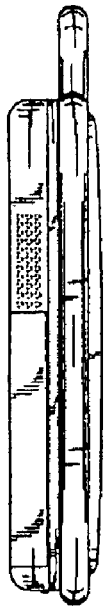
Figure 5:
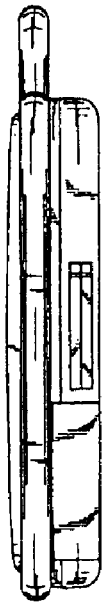
Figure 6:
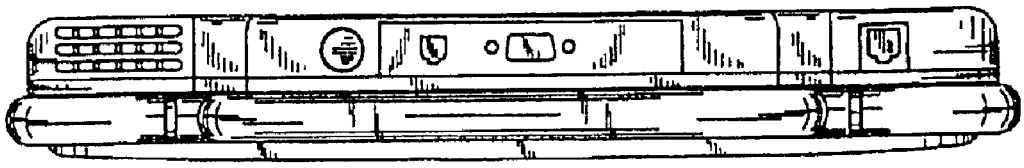
Figure 7:
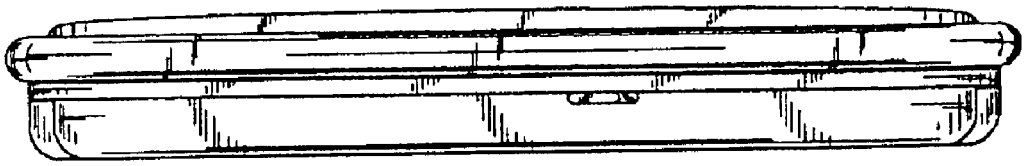
Figure 1:
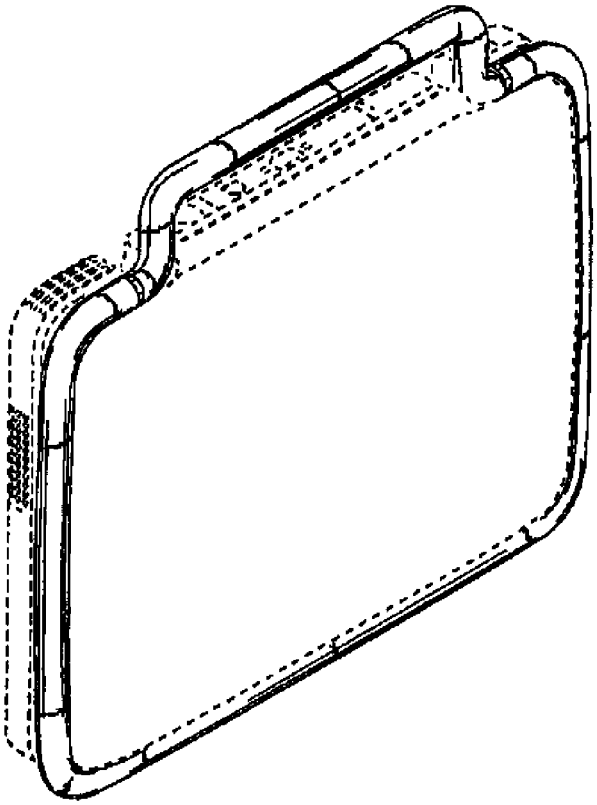
Figure 2:
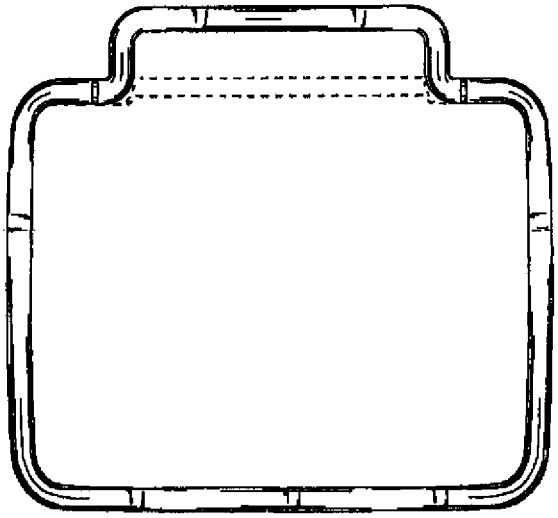
Figure 3:
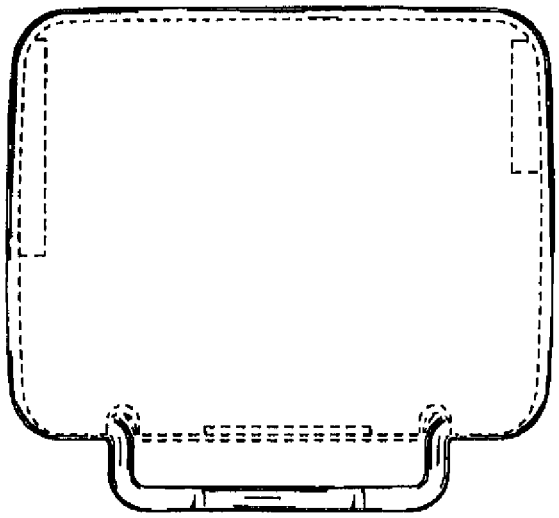
Figure 4:
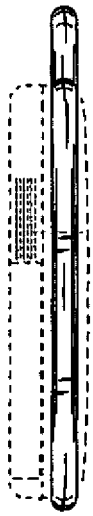
Figure 5:
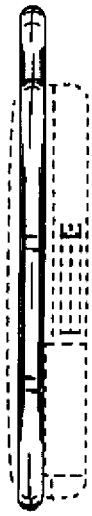
Figure 6:
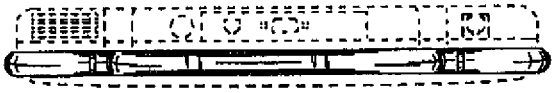
Figure 7:
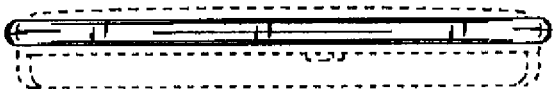
Figure 1:
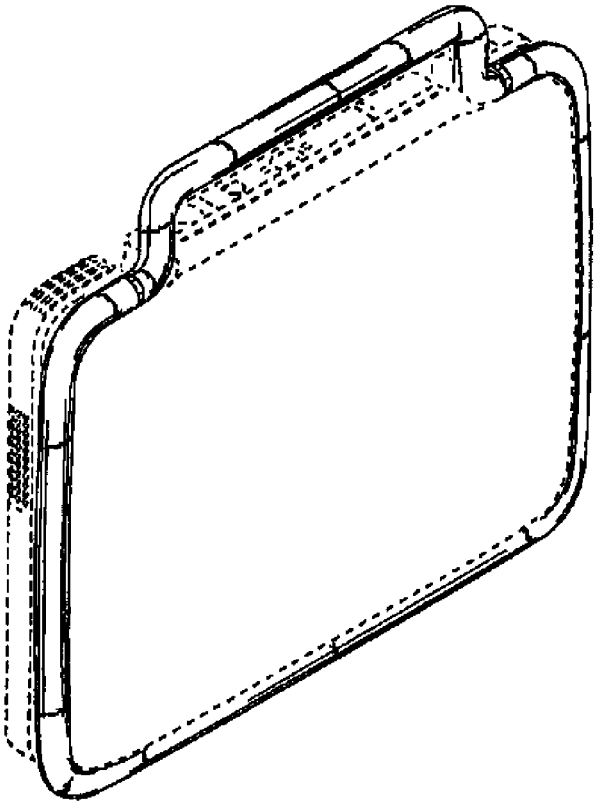
Figure 2:
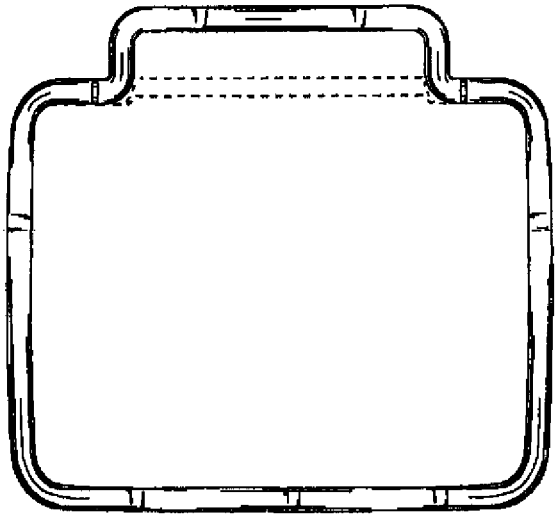
Figure 3:
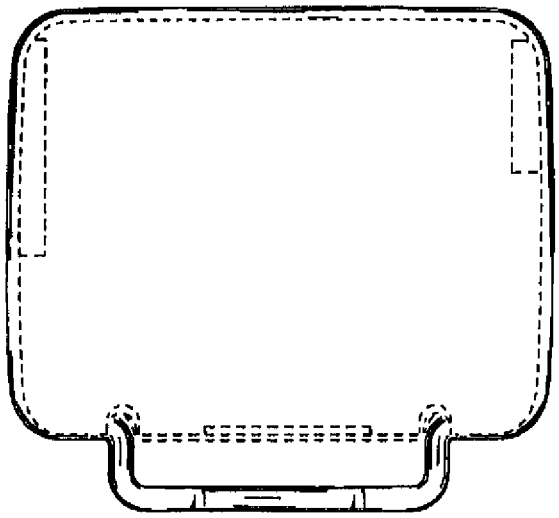
Figure 4:
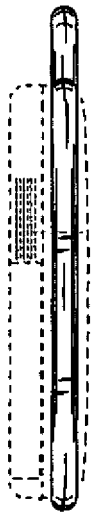
Figure 5:
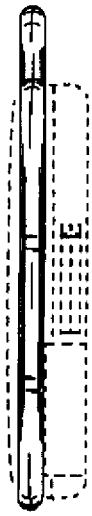
Figure 6:
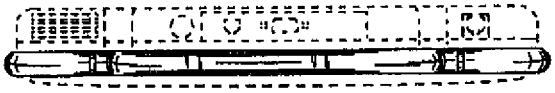
Figure 7:
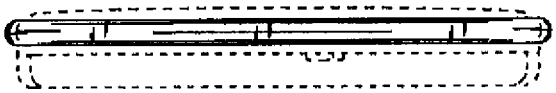

FIG. 1 is a perspective view of a computer showing my new design;
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof; and,
FIG. 7 is a bottom plan view thereof.
*Portions of FIGS. 1 and 4 that are shown as broken lines are for illustrative purpose only and form no part of the claimed design.*

1 Claim, 4 Drawing Sheets

Matter enclosed in heavy brackets [ ] appears in the original patent, but forms no part of this reissue; matter printed in italics indicates the additions made by reissue.

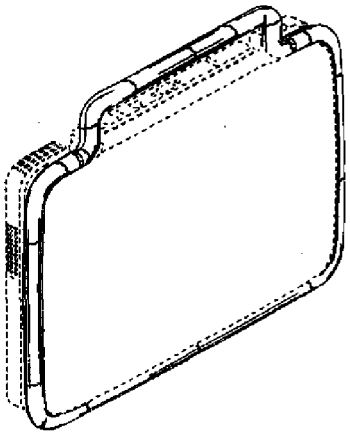

UNITED STATES PATENT AND TRADEMARK OFFICE

CERTIFICATE OF CORRECTION

PATENT NO. : RE 40,094 E
APPLICATION NO. : 29/218399
DATED : February 26, 2008
INVENTOR(S) : Nakano It is certified that error appears in the above-identified patent and that said Letters Patent is hereby corrected as shown below:

Title page illustrating a figure(s) should be deleted, and replaced with title page illustrating a figure(s). (attached)

Delete drawing sheets 1-4, and replace with new drawing sheets 1-4. (attached)

This certificate supersedes the Certificate of Correction issued June 23, 2009.

Signed and Sealed this

Twenty-first Day of July, 2009

John Doll

JOHN DOLL
*Acting Director of the United States Patent and Trademark Office*

(19) United States
(12) Reissued Patent
Nakano

(10) Patent Number: US RE40,094 E
(45) Date of Reissued Patent: Feb. 26, 2008

(54) COMPUTER

(75) Inventor: Rumi Nakano, Tokyo (JP)

(73) Assignee: Sony Corporation, Tokyo (JP)

(21) Appl. No.: 29/218,399

(22) Filed: Dec. 2, 2004

Related U.S. Patent Documents

Reissue of:
(64) Patent No.: Des. 466,499
Issued: Dec. 3, 2002
Appl. No.: 29/145,270
Filed: Jul. 20, 2001

(51) LOC (8) Cl. ..... 14-02
(52) U.S. Cl. ..... D14/328
(58) Field of Classification Search ..... D14/315, D14/322, 327, 328; D18/1, 2, 7, 11; 235/145 A, 235/145 R; 341/22, 23; 345/104, 156, 168, 345/169, 173; 361/680-686
See application file for complete search history.

(56) References Cited

U.S. PATENT DOCUMENTS

| | | | | | |
|---|---|---|---|---|---|
| D310,517 | S | * | 9/1990 | Hara et al. | D14/324 |
| D313,403 | S | * | 1/1991 | Esslinger et al. | D14/324 |
| D334,738 | S | * | 4/1993 | Kim | D14/324 |
| D392,625 | S | * | 3/1998 | Tang et al. | D14/324 |
| D430,156 | S | * | 8/2000 | Yamada | D14/328 |

FOREIGN PATENT DOCUMENTS

| | | |
|---|---|---|
| JP | 894367 | 3/1994 |
| JP | 8-94367 S | 3/1994 |
| JP | 938677 | 11/1995 |
| JP | 9-38677 S | 11/1995 |
| JP | 946656 | 2/1996 |
| JP | 9-46656 S | 2/1996 |
| JP | 955287 | 6/1996 |
| JP | 9-55287 S | 6/1996 |
| JP | 1014967 | 7/1998 |
| JP | 10-14967 S | 7/1998 |
| JP | 11-18613 S | 8/2001 |

OTHER PUBLICATIONS

Home page "Apple I-Book", 2pgs, Apple Computer Inc. (Mar. 2001).
Catalog "If Design Award 1997, 1998 CF 25", 2 pgs, Panasonic (1997 & 1998).
Home page "PetitWeb", 4 pgs, NTT (Apr. 2000).

* cited by examiner

*Primary Examiner*—Freda S. Nunn
(74) *Attorney, Agent, or Firm*—Rader, Fishman & Grauer, PLLC

(57) CLAIM

The ornamental design for a computer, as shown and described.

DESCRIPTION

FIG. 1 is a perspective view of a computer showing my new design;
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof; and,
FIG. 7 is a bottom plan view thereof.
*Portions of FIGS. 1 and 4 that are shown as broken lines are for illustrative purpose only and form no part of the claimed design.*

1 Claim, 4 Drawing Sheets

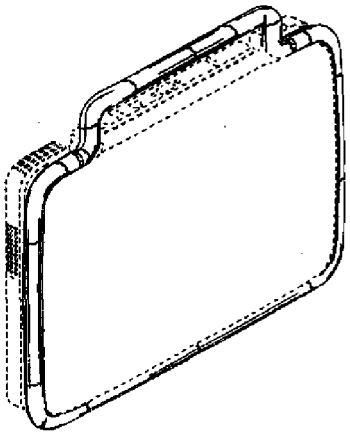

Matter enclosed in heavy brackets [ ] appears in the original patent, but forms no part of this reissue; matter printed in italics indicates the additions made by reissue.